United States Patent [19]

Vasta

[11] Patent Number: 4,760,167

[45] Date of Patent: Jul. 26, 1988

[54] COATING COMPOSITION OF AN AMINE POLYMER AND A BLOCKED POLYISOCYANATE

[75] Inventor: Joseph A. Vasta, Wilmington, Del.

[73] Assignee: E. I. Du Pont de Nemours and Company, Wilmington, Del.

[21] Appl. No.: 909,285

[22] Filed: Sep. 19, 1986

Related U.S. Application Data

[62] Division of Ser. No. 825,472, Feb. 3, 1986, Pat. No. 4,659,770.

[51] Int. Cl.$^4$ ............................................. C07C 101/24
[52] U.S. Cl. ............................................................ 560/125
[58] Field of Search ........................................ 560/125

[56] References Cited

U.S. PATENT DOCUMENTS

| | | | |
|---|---|---|---|
| 3,558,564 | 1/1977 | Vasta | 260/77.5 |
| 3,857,818 | 12/1974 | Frizelle | 260/77.5 TB |
| 4,020,216 | 4/1977 | Miller | 428/425 |
| 4,215,023 | 7/1980 | Strolle | 260/22 CB |
| 4,234,468 | 11/1980 | Dalibor | 260/31.2 R |
| 4,380,601 | 4/1983 | Welsh et al. | 524/555 |
| 4,531,010 | 7/1985 | Vasta | 560/125 |
| 4,555,535 | 11/1985 | Bednarek | 524/40 |

OTHER PUBLICATIONS

Publ. - Vazo (R) Polymerization Initiators - Du Pont.
Publ. Triacetondiamin - Hüls Datenblatt.
Publ. - Amines - Hüls Data Sheet.
Mobay Data Sheet.
Product Bulletin HDODA - Celanese Chemical Co.
Rodriguez, Principles of Polymer Systems, 2nd ed., Hemisphere Publishing Corp., 1982, pp. 17–30.

*Primary Examiner*—Michael L. Shippen
*Attorney, Agent, or Firm*—Hilmar L. Fricke

[57] ABSTRACT

A polymerizable compound of the formula:

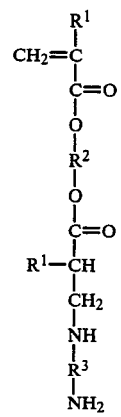

where $R^1$ is H or $CH_3$, $R^2$ is an aliphatic group and $R^3$ is a cycloaliphatic group and the polymer has a molecular weight of about 2,000 to 50,000;

The compound is useful for forming polymers used in coating compositions for finishing the exterior of automobiles and trucks.

1 Claim, No Drawings

COATING COMPOSITION OF AN AMINE POLYMER AND A BLOCKED POLYISOCYANATE

This application is a divisional application of Ser. No. 825,472 filed Feb. 3, 1986, now U.S. Pat. No. 4,659,770.

BACKGROUND OF THE INVENTION

This invention is related to coating composition useful for finishing automobiles and trucks.

Acrylic polyurethane coating compositions for automobiles and trucks are well known in the art. An acrylic polyurethane composition described in Vasta U.S. Pat. No. 3,558,564 issued Jan. 26, 1971 has been widely used for finishing and refinishing automobiles and trucks. Other high quality acrylic polyurethane finishes used for automobiles and trucks are shown in Crawley et al. U.S. Pat. No. 4,131,571, issued Dec. 26, 1978, Bednarek et al. U.S. Pat. No. 4,555,535 issued Nov. 26, 1985.

It is desirable to use compositions that contain blocked polyisocyanate crosslinking agents and that will crosslink and cure at relatively low baking temperatures to form durable finishes. To achieve low temperature cure of a composition containing a blocked isocyanate, an external catalyst is added to the composition generally just before the composition is applied. It would be desirable to have a coating composition that did not require the addition of an external catalyst and still provide a finish with acceptable properties for an automotive or truck finish.

SUMMARY OF THE INVENTION

A coating composition containing about 10-80% by weight of a binder and 20-90% by weight of an organic carrier; wherein the binder contains about A. 30-90% by weight, based on the weight of the binder, of an amine polymer of polymerized ethylenically unsaturated monomers and polymerized constituent of the formula:

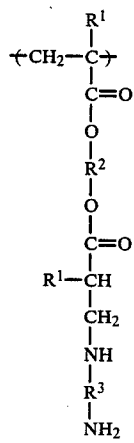

wherein $R^1$ is H or $CH_3$, $R^2$ is an aliphatic group and $R^3$ is a cycloaliphatic group and the polymer has a weight average molecular weight of 2,000-50,000; and B. 10-70% by weight of a blocked organic polyisocyanate.

The polymerizable constituent also is part of this invention.

DETAILED DESCRIPTION OF THE INVENTION

The coating composition provides a high quality finish having good gloss, excellent weatherability and durability, good adhesion to primed, rigid and flexible substrates and is useful for exterior finishes of automobiles and trucks.

The composition can be applied by conventional techniques such as spraying and baked at relatively low temperatures such as 60°-90° C. to fully cure the resulting finish. An external catalyst is not required since the pendent amine groups on the polymer are highly reactive and allow for low temperature curing with the blocked polyisocyanate.

The coating composition has a film forming binder content of about 10-80%, by weight and correspondingly, contains about 20-90%, by weight of an organic carrier which preferably, is a solvent for the binder. Preferably, the coating composition has a high solids content of about 50-80% by weight of binder and about 20-50% by weight of an organic solvent for the binder.

The binder of the composition contains about 30-90% by weight of an amine polymer and 10-70% by weight of a blocked polyisocyanate. Preferably, the binder contains about 30-85% by weight of the amine polymer and 15-70% by weight of a blocked polyisocyanate.

The coating composition can be used as clear coating or as a colored pigmented coating. Colored coatings generally contain pigments in a pigment to binder weight ratio of about 1/100 to 100/100.

The amine polymer has a weight average molecular weight of about 2,000 to 50,000, preferably 5,000 to 35,000 measured by gel permeation chromatography using polymethyl methacrylante as the standard.

The amine polymer has a backbone of polymerized ethylencially unsaturated monomers and polymerized into the backbone is a monomer of a diacrylate and a diamine which forms side chains pending from the backbone as shown by the aforementioned formula.

Typically ethylenically unsaturated monomers that can be used to form the amine polymer are alkyl acrylates and methacrylates having 1-12 carbon atoms in the alkyl groups, hydroxy alkyl acrylate or methacrylates having 2-4 carbon atoms in the alkyl group, styrene, vinyl toluene, acrylamide, methacrylamide, maleate and fumarate esters, alkyl esters of itaconic acid and the like.

Typical alkyl acrylates and methacrylates that can be used are as follows: methyl methacrylate, ethyl methacrylate, propyl methacrylate, butyl methacrylate, pentyl methacrylate, hexyl methacrylate, octyl methacrylate, decyl methacrylate, lauryl methacrylate, methyl acrylate, ethyl acrylate, propyl acrylate, butyl acrylate, octyl acrylate, nonyl acrylate, decyl acrylate, lauryl acrylate and the like.

Typical hydroxy alkyl acrylates and methacrylates that can be used are as follows: hydroxy ethyl acrylate, hydroxy propyl acrylate, hydroxy ethyl acrylate, hydroxy ethyl methacrylate, hydroxy propyl methacrylate and hydroxy butyl methacrylate.

Polymerized into the backbone is a monomer of a diacrylate and a diamine which form side chains on the polymer. Typically alkane diol diacrylates or methacrylates having 1-12 carbon atoms in the alkane group are used to form the monomer and are as follows: 1,6 hexane diol dimethacrylate, ethylene glycol diacrylate, propylene glycol diacrylate, 1,4 butane diol diacrylate, 1,4 butane diol dimethacrylate, 1,5 pentane diol diacrylate, 1,5 pentane diol dimethacrylate, 1,8 octane diol diacrylate, 1,8 octane diol dimethcarylate and the like.

Typically useful diamines are hindered cycloaliphatic diamines; one preferred diamine is isophorone diamine which is 3-aminomethyl-3,5,5-trimethylcyclohexylamine.

The monomer of the diamine and diacrylate has the following formula:

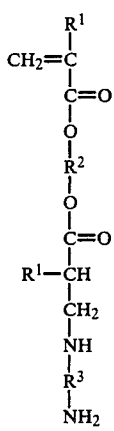

where $R^1$ is H or $CH_3$, $R^2$ is aliphatic group and $R^3$ is a cycloaliphatic groups. When the preferred diamine, isophorone diamine, is used to form the monomer $R^3$ is

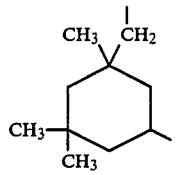

To provide the amine polymer with light stability a portion of the side chain constituents can contain a hindered amine such as triacetone diamine.

To form the above monomer the diamine and the diacrylate components are blended together and heated to about 50° to 100° C. for about 30 minutes to 45 minutes. Completion of the reaction to form the monomer is determined by titrating amine ($NH_2$) with perchloric acid in glacial acetic acid. The titration is done instrumentally using conventional titration equipment.

To form the amine polymer, conventional polymerization techniques are used. The monomers, solvents and polymerization catalyst are charged into a polymerization vessel and reacted at about 50° to 200° C. for about 0.5 to 6 hours to form the polymer.

Typical polymerization catalysts that are used are 1,1'azobisisobutyronitrile, azo-bis(cyclohexane carbonitrile) 2,2'azobis(2,4dimethylpentane nitrile), 2,2'azobis(2-methylbutane nitrile) and the like.

Typical solvents used to form the polymer are toluene, xylene, ethyl acetate, acetone, methyl ethyl ketone, methyl isobutyl ketone, ethanol, isopropanol and other aliphatic, cycloaliphatic and aromatic hydrocarbon esters, ethers, ketones and alcohols as are conventionally used.

Preferably, the amine polymer has 10 to 90% by weight of backbone of polymerized ethylenically unsaturated monomers and correspondingly 90 to 10% by weight of side chains having the above formula.

Preferred amine polymers are as follows:
A. Backbone—methylmethacrylate and styrene Sidechain—hexane diol diacrylate/isophorone diamine;
B. Backbone—styrene; Sidechain—hexane diol diacrylate/isophorone diamine;
C. Backbone—methyl methacrylate; Sidechain—hexane diol diacrylate/isophorone diamine.

The blocked polyisocyanate used in the coating composition is an aliphatic or cycloaliphatic polyisocyanate blocked with an ester such as dialkyl malonate or an alkyl ketoxime.

Typically aliphatic and cycloalphatic polyisocyanate that can be used are as follows: isophorone diisocyanate which is 3-isocyanatemethyl-3,3,3-trimethyl-cyclohexyl-isocyanate, propylene-1,2-diisocyanate, butylene-1,2-diisocyanate, butylene-1,3-diisocyanate, hexamethylene diisocyanate, methyl-2,6-diisocyanate, methyl-2,6-diisocyanate caproate, octamethylene diisocyanate, 2,4,4-trimethylhexamethylene diisocyanate, nonamethylene diisocyanate, 2,2,4-trimethylhexamethylene diisocyanate, decamethylene diisocyanate, 2,11-diisocyano-dodecane and the like; 2,2'-methylene-bis-(cyclohexyl isocyanate), 3,3'-methylene-bis-(cyclohexyl isocyanate), 4,4'-methylene-bis-(cyclohexyl isocyanate), 4,4'-ethylene-bis-(cyclohexyl isocyanate), 4,4'-propylene-bis-(cyclohexyl isocyanate),

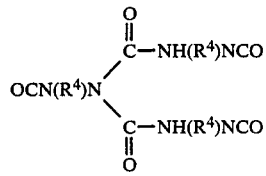

wherein $R^4$ is an aliphatic hydrocarbon group having 1-12 carbon atoms. One particularly preferred biuret is the biuret of hexamethylene diisocyanate. These biurets can be made according to Mayer et al U.S. Pat. No. 3,245,941, issued Apr. 12, 1966.

One particularly preferred polyisocyanate that forms a high quality durable and weatherable product is

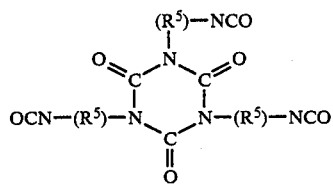

wherein $R^5$ is a hydrocarbon group having 6 carbon atoms. The above polyisocyanate is 1,3,5-tris(6-isocyanatohexyl) 1,3,5-triazine 2,4,6(H,3H,5H)trione.

Commercially available polyisocyanate compositions contain the above polyisocyanate and small amounts of higher molecular weight moieties such as dimers, trimers and hexamers of the above polyisocyanate.

The polyisocyanate is blocked with a compound that renders the isocyanate groups of the polyisocyanate non-active but when the blocking agent is disassociated from the isocyanate groups by heating of the coating composition after application to a substrate, the resulting free isocyanate groups then react with the amine polymer. Typical blocking agents that can be used are dialkyl malonates, preferably, dimethyl or diethyl malonate and alkyl ketoximes preferably, methyl ethyl ketoxime.

The coating composition can be non-pigment, clear or a pigmented coating composition. These pigments can be introduced into the composition by first forming a mill base with the above amine polymer which is an excellent pigment dispersant or with other compatible polymers or polymer dispersants by conventional techniques, such as sand-grinding, ball milling, attritor grinding. two roll milling to disperse the pigments. The mill base is blended with the film-forming constituents of the coating composition.

Any of the conventional pigments used in coating compositions can be utilized in the composition such as the following: metallic oxides, such as titanium dioxide, zinc oxide, iron oxide and the like, metal hydroxide, metal flakes such as aluminum flake, chromates, such as lead chromate, sulfides, sulfates, carbonates, carbon black, silica, talc, china clay, phthalocyanine blues and greens, organo reds, organo maroons and other organic pigments and dyes.

The coating composition can be used as a clear finish over a colored pigmented finish. To improve weatherability of the clear finish of the coating composition, and also of a conventional pigmented finish, about 0.1–5%, by weight, based on the weight of the binder, of a light stabilizer or a combination of ultraviolet light absorbers and stabilizers can be added.

These stabilizers include ultraviolet light absorbers, screeners, quenchers such as hindered amine light stabilizers, Also, about 0.1–5% by weight, based on the weight of the binder, of an antioxidant can be added.

Typical ultraviolet light stabilizers that are useful are as follows:

Benzophenones such as hydroxydodecylbenzophenone, 2,4-dihydroxybenzophenone, hydroxy-benzophenones containing sulfonic acid groups, 2,4-dihydroxy-3'-5'-di-t-butylbenzophenone, 2,2',4'-trihydroxybenzophenone esters of dicarboxylic acids, 2-hydroxy-4-acryloxyethoxybenzophenone, aliphatic mono-esters of 2,2',4-trihydroxy-4'-alkoxybenzophenone, 2-hydroxy-4-methoxy-2-carboxybenzophenone;

Triazoles such as 2-phenyl-4-(2'-4'-dihydroxybenzoyl)triazoles, substituted benzotriazoles such as hydroxyphenyltriazoles such as 2-(2'hydroxy-5'methylphenyl)benzotriazole, 2-(2'hydroxyphenyl)benzotriazole, 2-(2'hydroxy-5-octylphenyl)naphthatriazole:

Triazines such as 3,5-dialkyl-4-hydroxyphenyl derivatives of triazine, sulfur-containing derivatives of dialkyl-4-hydroxyphenyltriazines, hydroxyphenyl-1,3,5-triazines and such triazines containing sulfonic acid groups, aryl-1,3,5-triazines, orthohydroxyaryl-s-triazine:

Benzoates such as dibenzoate of diphenylolpropane, t-butyl benzoate of diphenylpropane, nonyl phenyl benzoate, octyl phenyl benzoate, resorcinol dibenzoate.

Other ultraviolet light stabilizers that can be used include lower alkyl thiomethylene-containing phenols, substituted benzenes such as 1,3-bis(2'hydroxybenzoyl)-benzene, metal derivatives of 3,5-di-t-b-utyl-4-hydroxyphenylpropionic acid, asymmetrical oxalic acid diarylamides, alkylhydroxyphenylthioalkanoic acid esters, dialkylhydroxyphenylalkanoic acid esters of di- and tri-pentaerythritol, phenyl- and naphthlene-substituted oxalic acid diamides, methyl-$\beta$-(3,5-di-t-butyl-4-hydroxyphenyl)propionate, $\alpha,\alpha$-bis(2-hydroxyphenyl)diisopropylbenzene, 3,5'-dibromo-2'-hydroxy-acetophenone, ester derivatives of 4,4-bis(4'-hydroxy-phenyl)-pentaonic acid wherein there is at least one unsubstituted position ortho to the aromatic hydroxyl groups, organophosphorus sulfides such as bis(diphenylphosphinothioyl)monosulfide and bis(diphenylphosphinothioyl)disulfide, 4-benzoyl-6-(dialkylhydroxybenzyl)resorcinol, bis(3-hydroxy-4-benzoylphenoxy)diphenylsilane, bis(3-hydroxy-4-benzoylphenoxy)dialkylsilane, 1,8-napththalimides, $\alpha,\alpha$ cyano-$\oplus,\beta$-diphenylacrylic acid derivatives, bis(2-benzoxazolyl)alkanes, bis(2-naphthoxazolyl)alkanes, methylene malonitriles containing aryl and heterocyclic substitutes, alkylene bis(dithio)carbamate, 4-benzoyl-3-hydroxyphenoxyethyl acrylate, 4-benzoyl-3-hydroxyphenoxyethyl methacrylate, aryl or alkyl-substituted acrylonitriles, 3-methyl-5-isopropylphenyl-6-hydroxycourmarone, 8-acetyldodecyl-7,7,9,9-tetramethyl-1,3,8-triazaspiro(4,5)decanol-2-4-dione.

Particularly useful light stabilizers that can be used are hindered amines of piperidyl derivatives such as those disclosed in Murayama et al. U.S. Pat. No. 4,061,616, issued Dec. 6, 1977, column 2, line 65, through column 4, line 2, and nickel compounds such as [1-phenyl-3-methyl-4-decanoylpyrazolate(5)]-Ni, bis[-phenyldithiocarbamato]-Ni (11), and others listed in the above Patent, column 8, line 44 through line 55.

The following blend of ultraviolet light stabilizers is particularly preferred 2-[2'-hydroxy-3'-5'-1(1-1-dimethyl-propyl)phenyl]benzotriazole and bis-[4-(1,2,2,6,6-pentamethylpiperidyl)] 2-butyl-2-[(3,5-t-butyl-4-hydroxyphenyl)methyl]propanedioate. The stabilizers can be used in any ratio however, a 1:1 ratio of benzotriazole to propanedioate is preferred.

Another useful blend of ultraviolet light stabilizers is 2-(benzotriazole-2-VL)-4,6-bis(methylethyl-1-phenyl ethyl)phenol, and 2(3-hydroxy-3,5-ditertiary amyl phenyl)benzotriazole.

The coating composition of this invention can be applied by any of the conventional application methods, such as spraying, electrostatic spraying, dipping, brushing, flow-coating and the like. The viscosity of the composition can be adjusted for any of these methods by adding one of the aforementioned solvents.

Generally, the composition is utilized at a high solids content which keeps air pollution at a minimum level. The composition is baked at relatively low temperatures of 50°–120° C. preferably 60°–90° C. for about 15 minutes–1 hour. The resulting finish is about 0.1–5 mils thick.

The composition can be applied over a wide variety of substrates such as metal, wood, glass, plastics, primed metals, or previous coated or painted metals. If used to repair an existing finish, the composition is usually applied over an acrylic primer surface. The composition can be applied directly to an acrylic lacquer or enamel finish that has been sanded and cleaned with solvent.

Also, composition can be applied as an original finish over an epoxy primer or other conventional primers or can be applied directly to bare metal. It is preferred to have the metal surface treated with a phosphate.

The following examples illustrate the invention. All parts and percentages are on a weight basis unless indicated otherwise. Molecular weights are determined by gel permeation chromatography using polymethyl methacrylate as the standard.

EXAMPLE 1

An isophorone diamine/hexane diol diacrylate monomer solution was prepared by charging the the following constituents into a reaction vessel equipped with a stirrer, a heating source, a nitrogen inlet and a reflux condenser:

|  | Parts By Weight |
|---|---|
| Portion 1 | |
| Isophorone diamine | 812.0 |
| Portion 2 | |
| 1,6 Hexane diol diacrylate | 1124.0 |
| Portion 3 | |
| Methyl ether of hydroquinone | 0.5 |
| Portion 4 | |
| Isopropanol | 171.0 |
| n-Butanol | 171.0 |
| Total | 2278.5 |

Portion 1 was charged into the reaction vessel and heated to 60° C. Portion 2 was added over a 30 minute period while holding the reaction mixture at 60° C. The reaction mixture was cooled to 25° C. under nitrogen gas and then Portion 3 was added and then Portion 4 was added to form a composition having a solids content of 85%.

An amine polymer solution was prepared by charging the following constituents into a reaction vessel equipped as described above:

|  | Parts By Weight |
|---|---|
| Portion 1 | |
| Isopropanol | 200.0 |
| n-Butanol | 200.0 |
| Toluene | 142.4 |
| Portion 2 | |
| Isophorone diamine/hexane diol diacrylate monomer solution (prepared above) | 1822.1 |
| Methyl methacrylate monomer | 193.6 |
| Styrene monomer | 193.6 |
| Vazo 88 (1,1'azo-bis(cyclohexane carbonitrile)) | 16.0 |
| Acetone | 144.0 |
| Portion 3 | |
| Vazo 88 (described above) | 5.0 |
| Acetone | 48.0 |
| Total | 2964.7 |

Portion 1 was charged into the reaction vessel and heated to its reflux temperature of about 89°–90° C.

Portion 2 was premixed and added slowly at a uniform rate over a 4 hour period to the reaction vessel while maintaining the resulting reaction mixture at its reflux temperature. Portion 3 was added at the end of the addition of portion 2 and then the reaction mixture was held at its reflux temperature for about 2 hours and then cooled to room temperature.

The resulting polymer solution has a solid content of 65%, the polymer contained 10% methyl methacrylate 10% styrene and 80% isophorone diamine/hexane diol diacrylate and had a weight average molecular weight of 20,000 and a number average molecular weight of 6,000.

A coating composition was prepared by charging the following constituents into a ball mill and grinding for 36 hours:

| Portion 1 | Parts By Weight |
|---|---|
| Amine Polymer Solution 1 (prepared above) | 488.2 |

| Portion 1 | Parts By Weight |
|---|---|
| Isopropanol | 109.5 |
| Butanol | 109.5 |
| Acetone | 47.1 |
| Blocked Polyisocyanate- ([1,3,5-tris(6 isocyanatohexyl) 1,3,5-triazine 2,4,6(1H,3H,5H)] trione blocked with dimethyl malonate) | 669.0 |
| Naphtha 100 solvent | 111.5 |
| Butyl acetate | 111.5 |
| Titanium Dioxide Pigment | 985.2 |
| "Fluoride" FC 430 (nonionic fluorosilicone wetting agent) | 0.2 |
| Toluene | 12.3 |
| "Tinuvin" 328 - 2-(2hydroxy-3,5-ditertiary phenol)-2-H—benzotriazole | 36.9 |
| Propylene glycol monomethyl ether acetate | 820.3 |
| Total | 3500.9 |

The resulting coating composition has a solids content of 62.3% and a pigment to binder weight ratio of 80/100.

The coating composition was reduced to a spray viscosity of 30 seconds (No. 2 Zahn cup) with methyl ethyl ketone and sprayed on to primed steel panels. 3 panels were baked at 82° C. for 60 minutes and 3 panels were baked at 105° C. for 30 minutes. Each panel had a glossy finish with an excellent appearance and the finish was hard, flexible and had good weatherability, had good adhesion to the substrate and good crack and chip resistance.

EXAMPLE 2

An amine polymer solution 2 was prepared by charging the following constituents into a reaction vessel equipped as in Example 1:

|  | Parts By Weight |
|---|---|
| Portion 1 | |
| Isopropanol | 200.0 |
| n-Butanol | 200.0 |
| toluene | 142.4 |
| Portion 2 | |
| Isophorone diamine/hexane diol diacrylate monomer solution (prepared in Example 1) | 2049.9 |
| Styrene monomer | 193.6 |
| Vazo 88 (described in Example 1) | 16.0 |
| Acetone | 48.0 |
| Portion 3 | |
| Vazo 88 (described in Example 1) | 5.0 |
| Acetone | 48.0 |
| Total | 2998.9 |

Portion 1 was charged into the reaction vessel and heated to its reflux temperature of about 89° to 90° C.

Portion 2 was premixed and slowly added at a uniform rate over a 4 hour period to the reaction vessel while maintaining the reaction mixture at its reflux temperature. Portion 3 was then added and the reaction mixture was held at its reflux temperature for about 2 hours and then was cooled to room temperature.

The resulting polymer solution has a solids content of 64.9%, the polymer contained 10% styrene and 90% isophorone diamine/hexane diol diacrylate and had a weight average molecular weight of 30,000 and a number average molecular weight of 6,000.

A coating composition was prepared identical to the composition of Example 1 except that above prepared amine polymer solution 2 was substituted for the amine polymer solution 1 to Example 1.

The resulting coating composition had a solids content of 62.3% and a pigment to binder weight ratio of 80/100.

The coating composition was reduced to a spray viscosity with methyl ethyl ketone as in Example 1 and sprayed on to primed steel panels and baked as in Example 1.

The resulting finish had an excellent appearance, good gloss, and good adhesion to the substrate, good weatherability and good hardness and flexibility and good chip and crack resistance.

EXAMPLE 3

An amine polymer solution 3 was prepared by charging the following constituents into a reaction vessel equipped as in Example 1:

|  | Parts By Weight |
| --- | --- |
| Portion 1 | |
| Isopropanol | 271.2 |
| n-Butanol | 271.2 |
| Portion 2 | |
| Isophorone diamine/hexane diol diacrylate monomer solution (prepared in Example 1) | 2049.9 |
| Methyl methacrylate monomer | 193.6 |
| Vazo 88 (described in Example 1) | 16.0 |
| Acetone | 144.0 |
| Portion 3 | |
| Vazo 88 (described in Example 1) | 5.0 |
| Acetone | 48.0 |
| Total | 2998.9 |

Portion 1 was charged into a reaction vessel and heated to its reflux temperature of about 89°–90° C. Portion 2 was premixed and slowly added at a uniform rate over a 4 hour period to the reaction vessel. Portion 3 then was added and the reaction mixture was held at its reflux temperature for about 2 hours and then was cooled to room temperature.

The resulting polymer solution had a solids content of 64.5%, the polymer contained 10%, methyl methacrylate and 90% isophorone diamine/hexane diol diacrylate and had a weight average molecular weight of 25,000 and a number average molecular weight of 7,000.

A coating composition was prepared identical to the composition of Example 1, except the above prepared amine polymer solution 3 was substituted for the amine polymer solution of Example 1.

The resulting coating composition had a solids content of 62.3% and a pigment to binder weight ratio of 80/100.

The coating composition was reduced to a spray viscosity with methyl ethyl ketone as in Example 1 and sprayed onto primed steel panels and baked as in Example 1.

The resulting finish had an excellent appearance, good gloss, and good adhesion to the substrate, good weatherability and good hardness and flexibility and good crack and chip resistance.

EXAMPLE 4

A diamine/diacrylate monomer solution was prepared by charging the following constituents into a reaction vessel equipped as in Example 1:

|  | Parts By Weight |
| --- | --- |
| Portion 1 | |
| Isophorone diamine | 788 |
| Triacetone diamine | 46 |
| Portion 2 | |
| 1,6 Hexane diol diacrylate | 1124 |
| Portion 3 | |
| Isopropanol | 447 |
| n-Butanol | 447 |
| Portion 4 | |
| Vazo 88 (described in Example 1) | 11 |
| Portion 5 | |
| Vazo 88 (described in Example 1) | 5 |
| Acetone | 48 |
| Portion 6 | |
| Vazo 88 (described in Example 1) | 5 |
| Acetone | 48 |
| Total | 3064 |

Portion 1 was charged into the reaction vessel and heated to 60° C. Portion 2 was added over a 30 minute period while holding the reaction mixture at 60° C. The reaction mixture was held at this temperature for an additional 30 minutes. Portion 3 was added and the reaction mixture was heated to its reflux temperature. Portion 4 was added over a 15 minute period and then the reaction mixture was held at its reflux temperature for 2 hours and Portion 5 was added.

The reaction mixture was held at its reflux temperature for an additional hour and Portion 6 was added and then the reaction mixture was allowed to cool to room temperature.

An amine polymer solution was prepared using the same constituents in the same amounts as in Example 3 except the above prepared diamine/diacrylate monomer solution was substituted for the isophorone diamine/hexanediol diacrylate monomer solution used in Example 3. The resulting amine polymer solution had about the same solids content and the polymer had about the same molecular weight as in Example 3.

A coating composition was prepared by charging the following constituents into a ball mill and grinding for 36 hours:

| Portion 1 | Parts By Weight |
| --- | --- |
| Amine polymer solution (prepared above) | 109.55 |
| Blocked polyisocyanate (biuret of hexamethylene diisoycanate blocked with methyl ethyl ketone) | 40.00 |
| Titanium dioxide pigment | 80.00 |
| Acrylate flow control agent | 0.50 |
| Xylene | 23.82 |
| Propylene glycol monomethyl ether acetate | 23.82 |
| Total | 277.69 |

The coating composition was reduced to a spray viscosity of 30 seconds (No. 2 Zahn cup) with 85/15 mixture of xylene/propylene glycol monomethyl ether acetate and sprayed onto zinc phosphate treated steel panels. The composition was flash dried for 15 to 20 minutes and then baked at 99° C. for 45 minutes. The resulting coating had a high gloss of 85 to 90 measured at 20°, a pencil hardness of HB-H and a Tukon hardness of 6 to 9 knoops, excellent impact and flexibility, was resistant to 200 rubs with methyl ethyl ketone and had excellent resistance to QUV accelerated weathering test.

What is claimed is:
1. A compound of the formula:
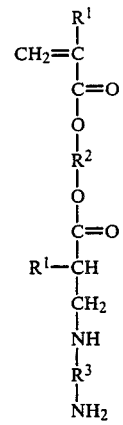
wherein $R^1$ is H, $R^2$ is $(CH_2)_6$ and $R^3$ is
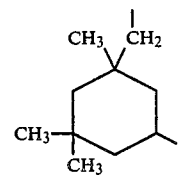
* * * * *